United States Patent [19]
Ito et al.

[11] 4,291,960
[45] Sep. 29, 1981

[54] DISPLAY DEVICE

[75] Inventors: Tadashi Ito, Kanagawa; Hiroyasu Murakami, Tokyo; Masayuki Suzuki; Masayoshi Yamamichi, both of Kawasaki; Nobuaki Sakurada, Kanagawa; Nobuhiko Shinoda, Tokyo, all of Japan

[73] Assignee: Canon Kabushiki Kaisha, Tokyo, Japan

[21] Appl. No.: 17,923

[22] Filed: Mar. 6, 1979

Related U.S. Application Data

[63] Continuation of Ser. No. 825,081, Aug. 16, 1977, abandoned.

[30] Foreign Application Priority Data

Sep. 3, 1976 [JP] Japan ............................. 51-105458

[51] Int. Cl.$^3$ .......................................... G03B 17/20
[52] U.S. Cl. .................................. 354/53; 354/60 L; 354/289
[58] Field of Search .................... 354/23 D, 53, 60 L, 354/60 E, 289; 340/249, 251, 336

[56] References Cited

U.S. PATENT DOCUMENTS

| | | | |
|---|---|---|---|
| 3,164,075 | 1/1965 | Schulze | 354/60 E |
| 3,527,149 | 9/1970 | Starp et al. | 354/60 E |
| 3,698,299 | 10/1972 | Arisaka et al. | 354/60 L X |
| 3,699,857 | 10/1972 | Wagner et al. | 354/60 L |

FOREIGN PATENT DOCUMENTS 1810377  11/1968  Fed. Rep. of Germany ...... 354/289

Primary Examiner—Michael L. Gellner
Attorney, Agent, or Firm—Toren, McGeady & Stanger

[57] ABSTRACT

In the display system disclosed, a manually operated switching arrangement sets a display circuit, which displays data in response to a data signal from a data circuit, either into a display mode or a non-display mode. A control arrangement controls the display of the display circuit independently of the switching arrangement and produces a display signal automatically when a display operation is necessary. A warning circuit sets the display circuit into the display state independent of the switching means for displaying warning data instead of display data.

15 Claims, 6 Drawing Figures

DISPLAY DEVICE

This is a continuation of application Ser. No. 825,081, filed Aug. 16, 1977, now abandoned.

BACKGROUND OF THE INVENTION

1. Field of the Invention

This invention relates to a display device for indicating various kinds of informations, and more particularly to a display device having a deactuating or actuating switch for making the device inoperative or operative.

2. Description of the Prior Art

It is well known that a display device for displaying a various information is made operative during a desired period by operating an actuating switch into the on-state. The operating switch is provided in order to prevent unnecessary loss of electric power supply. In a camera, the switch prevents obstruction of the view finder with the data, and prevents the data from adversely affecting other devices such as a photometric device by photo-coupling with each other.

However, the display device may be made inoperative by turning the switch off and the device. On the other hand the display may be used to indicate a warning. Accordingly, the operator can not find out be warned without operating the actuating switch.

The above described situation may occur in a photographic camera. Such a display device usually comprises an illuminant display unit consisting of light emitting diodes, and is positioned in the viewing field of the camera finder for indicating various kinds of conditions and exposure value informations.

Further, this display device usually has the above described actuating switch for making the display device operative only when the operator wants to view the displayed information. The electric power consumption of the display device is too high for a small camera battery.

Another reason why the switch is usually provided is that the continuous display disturbs the operator's framing operation and may influence the photometric result so on, when the camera's exposure metering is of TTC type, since the display device is positioned in a viewing field of the camera finder.

Accordingly, the actuating switch is operated so as to turn on only in a display mode, and otherwise to turn off. Such operation of the actuating switch, however, fails to warn of undesirable situation even if they have occurred. Thus the operator continues photographing without being aware of an improper condition and fails to take a good photograph.

SUMMARY OF THE INVENTION

An object of this invention is to provide a display device which indicates or displays a warning, a mismanupulating condition and so on when the respective situations happens even if the display device is in an ineffective state.

Another object of this invention is to provide a display device for photographic camera which indicates or displays a warning, mismanupulating condition and so on when the respective situations happens even if the display device is in an ineffective state.

Other objects of the invention will become apparent from the following detailed description of preferred embodiments of the invention taken in conjunction with the accompanying drawings in which:

DESCRIPTION OF THE PREFERRED EMBODIMENTS

Figure 1:
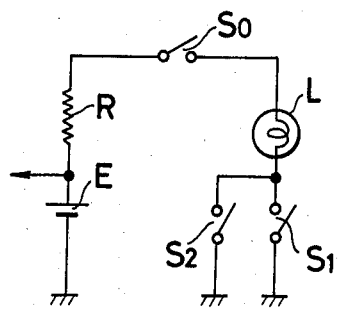
FIG. 1 is a schematic circuit diagram of an example of a conventional actuating switch arrangement in a display control circuit.

In FIG. 1, an example of the conventional display control circuit is shown comprising an electrical power source or battery E which supplies electrical power not only to an indicator lamp L but also to not shown circuit portions, a resistor R connected in series to the battery E, a power supply control switch $S_0$ arranged to be manually operable and connected in a lead between the resistor R and the indicator lamp L, and two switches $S_1$ and $S_2$ connected in parallel to each other and between the indicator lamp L and circuit ground and arranged to be closed in automatic response to occurrence of an out-of-range adjustment or erroneous setting operation. With this arrangement of switches $S_0$, $S_1$ and $S_2$, as mentioned before, when the switch $S_0$ is in the open position, it is impossible for the automatic closure of either or both of the switches $S_1$ and $S_2$ to actuate the display control circuit for the showing of an out-of-range or erroneous setting informations. Therefore, in the display system using such actuating switch arrangement, it is required that the control circuit be always made operative. Thus, the provision of the display-off switch $S_0$ is not so much advantageous as desired.

Figure 2:
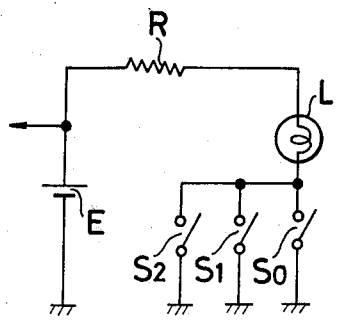
FIG. 2 is a similar diagram showing the principles of the present invention.

FIG. 2 schematically shows the principles of the actuating switch arrangement in a display control circuit of the present invention, wherein the same reference characters have been employed to denote the similar parts to those shown in FIG. 1. As shown in FIG. 2, the display-off switch $S_0$ is connected in parallel with the switches $S_1$ and $S_2$ so that when the switch $S_0$ is opened to terminate the display of one information, and when both of the switches $S_1$ and $S_2$ remain in their open positions, the indicator lamp is rendered inoperative. But, with the display-off switch $S_0$ left in the open position, when some abnormal condition has occurred to automatically close either or both of the switches $S_1$ and $S_2$, the display control circuit starts to operate for the showing of a corresponding indicium by the lamp L. As an example of the abnormal condition, mentioned may be made of the falling of the voltage of the battery E below a satisfactory operating level. In this case, the voltage checking can be automatically effected at the time only when the actual voltage of the battery has fallen below the satisfactory operating level despite of the fact that the display-off switch $S_0$ is left unactuated or in this instance, open.

Figure 3:
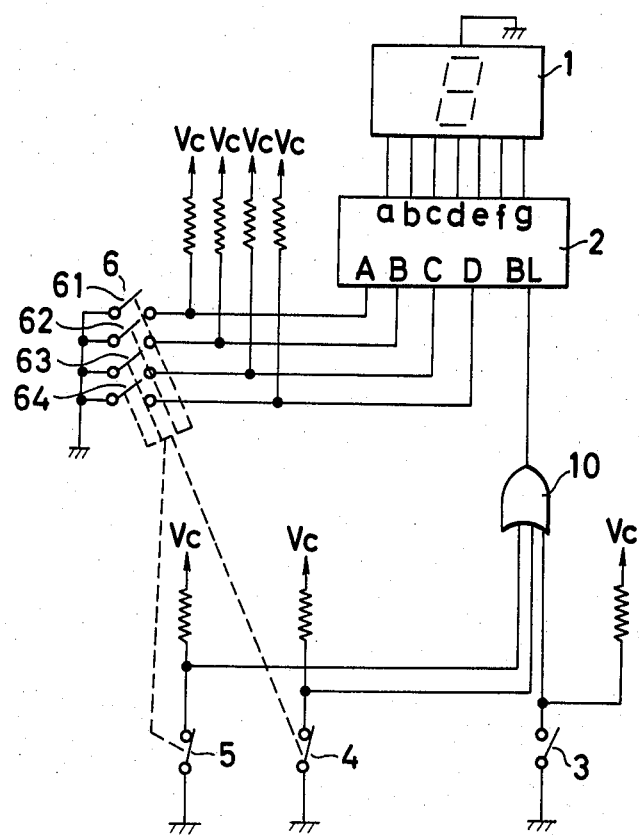
FIG. 3 is a schematic circuit diagram, partly in block form, of one embodiment of a display system according to the present invention.

Referring to FIG. 3, there is shown one embodiment of the present invention applied to a digital display system. This system includes a readout device 1 of the seven segment type constructed from a combination of light-emitting diodes (LED), a 7-segment decoder driver 2 available from, for example Texas Instruments Incorporated, under the tradename of SN7449, responsive to digital information appearing at input terminals A, B, C and D thereof for producing seven output signals appearing at respective output terminals, a, to, g, thereof by which the readout device 1 is driven for displaying one of the ten digits from zero to nine inclusive. The decoder driver 2 has a blanking input terminal BL responsive to an output of an actuating switch arrangement for causing the decoder driver 2 to render the readout device 1 operative and inoperative when the output is of logical high and low levels H and L respectively. The actuating switch arrangement comprises three switches 3, 4 and 5 corresponding to the switches $S_0$, $S_1$ and $S_2$ of FIG. 2 respectively and each connected between a common reference voltage source Vc and circuit ground, with the outputs of these three switches 3, 4 and 5 being connected to respective inputs of an OR gate 10 having an output connected to the blanking input of the decoder driver 2. To introduce digital information into the decoder driver 2, there is provided a switch element assembly 6 consisting of four switch elements 61, 62, 63 and 64 connected at one ends thereof to the respective input terminals A to D of the driver 2 and also to the common reference voltage source and at the other ends to circuit ground. When the switch element is open, a signal of "H" level is applied to the decoder driver 2, and the vice versa. As schematically shown by dashed lines, the switch element assembly 6 is arranged to cooperate with either of the switches 4 and 5 in such a manner that when the switch 4 or 5 is open, all the switch elements 61 to 64 are closed.

The display system of FIG. 3 operates as follows: The high signal, "H", is assumed to be applied to each of the terminals indicated by the arrow, and the low signal, "L", to be applied to each of the terminals indicated by symbol for earth. Suppose that the display-off switch 3 is open and the warning switches 4 and 5 are closed, then one of the input terminals of the OR gate 10 receives a "H" signal and produces a "H" signal which is applied to the blanking input terminal of the decoder driver 2. The readout device 1 is thus rendered operative to display a digit dependent upon the particular combination of the switched positions of the switch elements 61 to 64. Let us now assume that a warning signal producing circuit not shown is actuated for some reason at a time during the display operation, then one of the switches 4 is automatically opened to produce a "H" signal which is applied through the OR gate 10 to the blanking input terminal BL of the decoder driver 2 which was previously rendered operative by the display-off switch 3. At the same time, all the switch elements 61 to 64 are closed by the linkage with the switch 4. The readout device 1 is actuated to display a digit zero representative of the out-of-range information. Alternatively, when an erroneous operation of the system takes place, the switch 5 is opened to apply a "H" signal to the OR gate 10, and at the same time the switch elements 61 to 64 are closed by the linkage with the switch 5. Hence the readout device 1 is caused to display the digit zero, so that the operator is aware of the fact that some erroneous operation is in progress.

In order to limit power consumption, or to avoid disturbance from the light of the readout device 1, the operator will manipulate the display-off switch 3 to the unactuated, in this instance, closed position An "L" signal is then applied through the OR gate 10 to the decoder driver 2, so that, as the warning switches 4 and 5 are closed, the display is turned off. In this state, when either an out-of-range condition, or erroneous operation has taken place, either of the warning switches 4 and 5 is turned off. This causes appearance of an "H" signal at one of the input terminals of the OR gate 10 and hence an "H" signal at the output terminal thereof The H signal is then applied to the decoder driver 2, causing the readout device 1 to start in operation for the showing of the particular indicium, in this instance, the digit zero, because the switch elements 61 to 64 are closed in response to the opening of either of the switches 4 and 5. This occurs despite of the fact that the display-off switch 3 remains closed. An example of the warning signal producing circuit will be illustrated in connection with another embodiment of the invention shown in FIG. 4.

Figure 4:
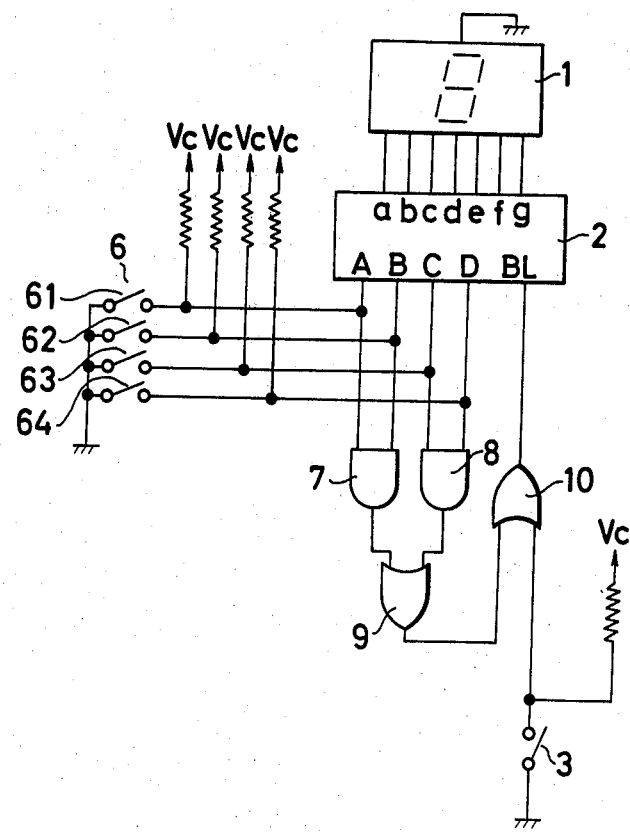
FIG. 4 is a similar diagram showing another embodiment of the invention.

FIG. 4 shows a digital display system which is different from that of FIG. 3 in that instead of using the mechanical switches 4 and 5, use is made of two AND gates 7 and 8 receptive of all the outputs of the digital information producing switch element assembly 6 and responsive to any of the specified combinations of the outputs for producing an actuating signal which is applied through an OR gate 9 and then through the OR gate 10 corresponding to that of FIG. 3 to the blanking input terminal of the decoder driver 2. With the arrangement of the AND gates 7 and 8 illustrated in FIG. 4, those of the combinations of the outputs of the switch assembly which are specified as the inhibiting information are binary words (0011), (0111), (1011), and (1100) to (1111), as the switch elements 61 to 64 assume the fourth, third, second and first bit positions respectively. These binary words corresponds to the digit words, "3", "7", "11" and "12" to "15" respectively.

The operation of the display system of FIG. 4 is as follows: If the normal display operation is desired to be performed, the operator will turn off the switch 3 likewise as in the system of FIG. 3, thereby any of the possible combination of the outputs of the switch elements 61 to 64 can be displayed in the digital form by the readout device 1. Now assuming that a digit word "3" is set in the switch element assembly 6 at a time during the process of no normal display because of the occurrence of closure of the display-off switch 3, then the switch elements 63 and 64 are closed. This causes the first AND gate 7 to produce an output of high level "H" which is then applied through the first and second OR gates 9 and 10 to the blanking input terminal BL of the decoder driver 2. Hence the display operation of the readout device 1 is initiated to display the digit three, informing the operator of the fact that the information set in the switch element assembly 6 is inhibitive. Other digit words, "7" and "11" to "15" inclusive can be displayed in a manner similar to that shown above even when the display-off switch is left unactuated.

Figure 5:
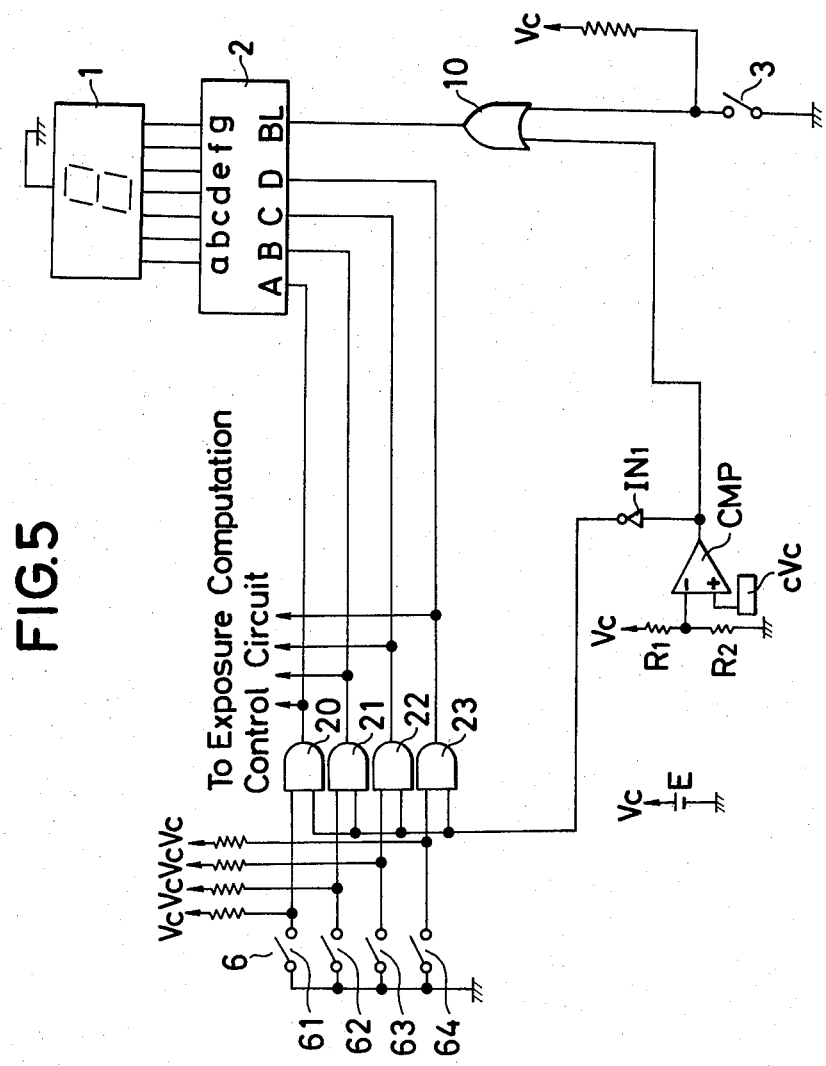
FIG. 5 is a schematic circuit diagram showing an example of application of the actuating switch arrangement of the invention to a display system for displaying an exposure value and an out-of-range indicating symbol for battery voltage selectively in a photographic camera.

FIG. 5 shows an example of a display system adapted for use in a photographic camera with its display control circuit of the invention being associated with a battery voltage checking circuit. In this figure, the same reference characters have been employed to denote the similar parts to those shown in FIG. 3. The battery voltage checking circuit comprises a voltage divider of two resistors $R_1$ and $R_2$ connected in series to each other and to the battery E of which the actual voltage is to be tested and a comparator circuit CMP having a negative input terminal connected to a point on connection between the resistors $R_1$ and $R_2$ and having a positive input terminal connected to a constant voltage source CVC. The output terminal of the comparator circuit CMP is connected both to one of the input terminals of the OR gate 10 and to four AND gate 20 to 23 at their one input terminals by way of a common lead through an inverter $IN_1$, the other input terminals of the AND gates 20 to 24 being connected to the respective switch elements 61 to 64, and the output terminals of the AND gates 20 to 24 being connected to the respective input terminals A to D of the decoder driver 2.

In operating the system of FIG. 5, when the switch 3 is open to perform the normal display and when the actual voltage of the battery E is above a predetermined operating level, as the output of the comparator CMP is of the "L" level and the AND gates 20 to 23 are gated on by the "H" level output of the inverter $IN_1$, a value of an exposure control factor set in the switch element assembly 6 is displayed in the digital form by the readout device 1. During this display process, when it happens that the actual voltage of the battery E falls below the predetermined operating level necessary to perform reliable exposure control operation, the comparator CMP changes its output from "L" level to "H" level, and the "H" level output after inverted to "L" level by the inverter $IN_1$ is applied to the one input terminals of the AND gates 20 to 23, thereby each of the outputs of the AND gates 20 to 23 is caused to take at the "L" level independently of what value of the exposure factor is set in the switch assembly 6, and therefore the readout device 1 is turned to display the digit zero representative of the out-of-range information for the battery voltage. Alternately, when the switch 3 is in the closed position where no display is made by the readout device 1, and when the actual voltage of the battery E has fallen below the predetermined operating level necessary to perform exposure control by a not shown electronic shutter, the output of the comparator circuit CMP becomes of "H" level with simultaneous actuation of the decoder driver 2, so that the readout device 1 displays the digit zero likewise as in the above, informing the operator of the fact that the voltage of the battery E has dropped.

Figure 6:
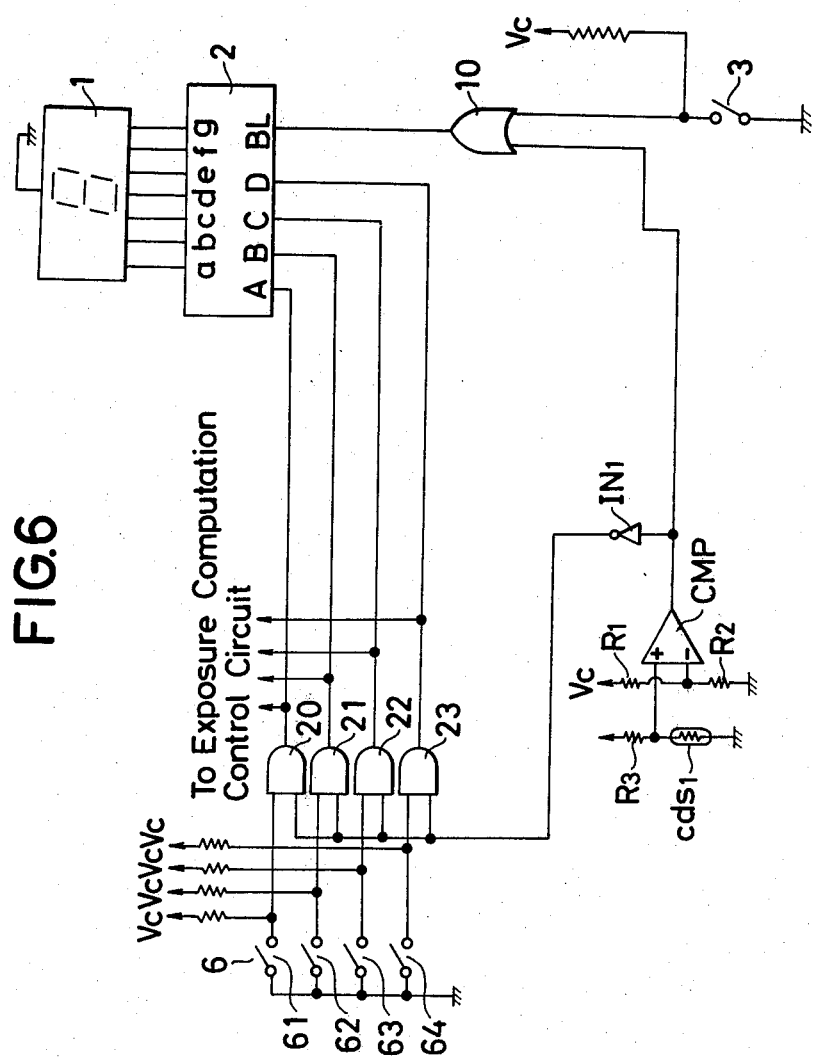
FIG. 6 is a similar diagram showing another example of application of the invention to the display of an out-of-range indicating symbol for object brightness level.

FIG. 6 shows another example of application of the invention to the out-of-range information for object brightness level. The control circuit of FIG. 6 is different from that of FIG. 5 in that the positive input terminal of the comparator circuit CMP is connected not to the constant voltage source CVC but to a point on connection between a resistor $R_3$ and a light-sensitive element such as cadmium sulfide $CdS_1$. Next, the operation of the circuit of FIG. 6 will be explained. With the display-off switch 3 set in the open position where the readout device 1 is operative, when a desired value of an exposure control factor such as shutter speed is set in the switch element assembly 6, this desired value is displayed in the digital form by the readout device 1. Suppose that the object brightness level as sensed by the light-sensitive element $CdS_1$ is lowered below an operating range at a time during the display process of the readout device 1, then the resistance value of the light-sensitive element $CdS_1$ exceeds the level as determined by the output voltage of the voltage divider $R_1$, $R_2$, causing the comparator circuit CMP to produce an output of "H" level which after inverted by the inverter $IN_1$ to the "L" level is applied to the one input terminals of the AND gates 20 to 23, with the resulting display of the readout device 1 being of the digit "0" and informing the operator of the fact that there is need to use flash illumination in making a correct exposure. The display-off switch 3 may be closed to stop the display of the readout device 1. Thereafter, the operator will manipulate the shutter speed setting switch 6. During this setting operation, when it happens that the comparator circuit CMP produces an output of "H" level, in other words, the object brightness is decreased to so large extent that a shutter speed of 1/30 second must be employed for daylight exposure or that a flash exposure with a faster shutter speed must be made, the readout device 1 starts to operate for displaying the digit "0".

It will be seen from the foregoing that the present invention contemplates the use of a display-off switch in a display control circuit while nevertheless permitting display operation to start in automatic response to the occurrence of an out-of-range information or erroneous operation even when the display-off switch is left unactuated. With the display control circuit associated with a battery voltage checking circuit, it is possible to increase the accuracy and reliability of exposure control. As the number of informations to be displayed by a single readout device is increased, it becomes of importance to make display of necessary information only at a right time. Particularly in application of the display system of the invention to photography, a premature consumption of electrical energy of the battery can be prevented without sacrificing the accuracy and reliability of exposure control as there is a decreased possibility of overlooking the necessary manipulation of the camera.

What is claimed is:
1. A display system including:
   (a) a display information signal forming circuit for producing a signal corresponding to display information,
   (b) a display circuit for displaying the display information in response to said signal from display information signal forming circuit,
   (c) manually operated display control switch means for controlling the operation of said display circuit and for setting said display circuit into either a display state and a non-display state,
   (d) display control means for controlling a display by said display circuit independently of said display control switch means, said means being arranged to produce a display signal automatically when a display operation is necessary; and
   (e) warning information signal forming circuit for forming warning information, said display circuit being set into said display state in response to display signal independently of said display control switch means for displaying the warning information instead of said display information.

2. A display system according to claim 1, wherein said signal forming means includes switch means connected in parallel with said switch means.

3. A display system according to claim 1, wherein said signal forming means includes a voltage detecting circuit for detecting the voltage of an electrical power source and for producing said warning signal when the voltage of the electrical power source and for producing said warning signal when the voltage of the electrical power source is below a predetermined value.

4. A display system according to claim 1, wherein said signal forming means includes a light sensitive element for detecting the brightness of an object to be photographed and an object brightness detecting circuit for producing said warning signal when the output of said light sensitive element reaches a predetermined level.

5. A display system including:
(a) display means for displaying input information,
(b) display information forming circuit for providing display information to said display means,
(c) manually operated switch means settable into a first and a second state,
(d) drive means for driving said display means in response to the first state of said switch means and stopping the display by the display means in response to the second state thereof
(e) signal forming means for forming a warning signal for driving said drive means independently of the state of said switch means and automatically when a warning display operation is necessary, said drive means being constructed to drive the display means in response to said warning signal, and
(f) warning information forming means for forming warning information and applying the warning information instead of said display information to the display means in response to the warning signal so that even when the switch means is in the second state, the production of the warning signal results in a warning display operation.

6. A display device including:
(a) display information forming circuit for forming display information,
(b) a display circuit,
(c) manually operated switch means having a display position and non-display position for displaying the display information when said switch is in a display position,
(d) control means for controlling the display of said display circuit independently of said switch means and for producing a display signal automatically when a warning display is necessary, and
(e) warning information forming means for forming warning information different from the information of display, said display circuit being automatically set to the display state and displaying the warning information in response to a display signal.

7. A display device for a camera including:
(a) character display means for displaying exposure information,
(b) exposure information signal forming means for forming an exposure information signal,
(c) manually operable display control switch means for controlling the display operation of said display means, having a display setting and a non-display setting for producing a display signal when the switch means is set at the display setting,
(d) a display control circuit having a control terminal, said circuit being arranged to activate the character display means for displaying a character based on the exposure information signal from the exposure information signal forming means when the display signal is applied to the control terminal,
(e) means connected to said control terminal for controlling the display operation of display means independently of said display control switch and for producing a warning signal when a warning operation is necessary, and
(f) warning character signal forming means for producing a warning character signal different from said exposure information signal, said warning character signal being arranged to be applied to the display control circuit instead of exposure information signal in response to the warning signal, so that said display control circuit activates the character display means for displaying warning characters in response to the warning signal, independently of said display signal from said display control switch.

8. A display device according to claim 7, wherein said warning signal producing means includes a voltage detecting circuit for detecting the voltage of an electrical power source and for producing said warning signal when the voltage of electrical power source is below a predetermined value.

9. A display device according to claim 7, wherein said warning signal producing means is provided with means for detecting an erroneous operation made by operating means and is arranged to produce a warning signal upon detection of an erroneous operation.

10. A display device comprising:
(a) display information forming means for forming a display information signal,
(b) manually operated switch means, said means having a display position and non-display position,
(c) a display circuit for displaying information corresponding to an input information signal and becoming operative when said switch means is in a display position,
(d) applying means for applying said display information signal to said display circuit,
(e) warning signal forming means for forming a warning signal when warning operation is necessary, said display circuit being arranged to become operative, independently of the position of switch means, in response to said warning signal, and
(f) warning information forming circuit for forming a warning information signal, said applying means being arranged to apply said warning information signal instead of said display information signal to said display circuit when said warning signal is produced.

11. A display device comprising:
(a) display information forming means for forming a display information signal,
(b) warning signal forming means for forming a warning signal when a warning operation is necessary and for making said display circuit becomes operative, independently of the position of switch means, in response to said warning signal,
(c) display circuit for displaying said display information corresponding to said display information signal when said switch means is in a display position and for becoming non-operative when said switch means is in a non-display position,
(d) warning signal forming means for forming a warning signal when a warning operation is necessary, and
(e) a warning information forming circuit for forming a warning information signal in response to said warning signal, said warning information forming circuit being coupled to said display circuit, and said display circuit being arranged to become operative in response to said warning signal independently of the position of the switch means and to display the warning information instead of display information.

12. A display system according to claim 11, wherein the warning signal forming means includes detecting means for detecting the operating condition of the operation member to form the warning signal at the time of operation.

13. A display system according to claim 11, wherein said display information forming means includes an information signal forming circuit for producing an exposure information signal, and the warning signal forming means includes detecting means for detecting the exposure information signal of the information signal forming circuit to form the warning signal when the exposure information signal reaches a predetermined value.

14. A display system according to claim 11, wherein the warning signal forming means includes detecting means for detecting the voltage of a power source to produce the warning signal when the voltage reaches a predetermined value.

15. A display device comprising:
(a) display circuit for displaying information corresponding to an input signal,
(b) manually operated switch means having a display position and non-display position and for making said display circuit becomes operative when said switch means is in the display position and non-operative when said switch means is in the non-display position,
(c) warning signal forming circuit for forming a warning signal when a warning operation is necessary, and
(d) information providing circuit connected to said display circuit for providing display information and a warning information different from said display information and instead of said display information to said display circuit in response to said warning signal.

* * * * *